Figure 4:
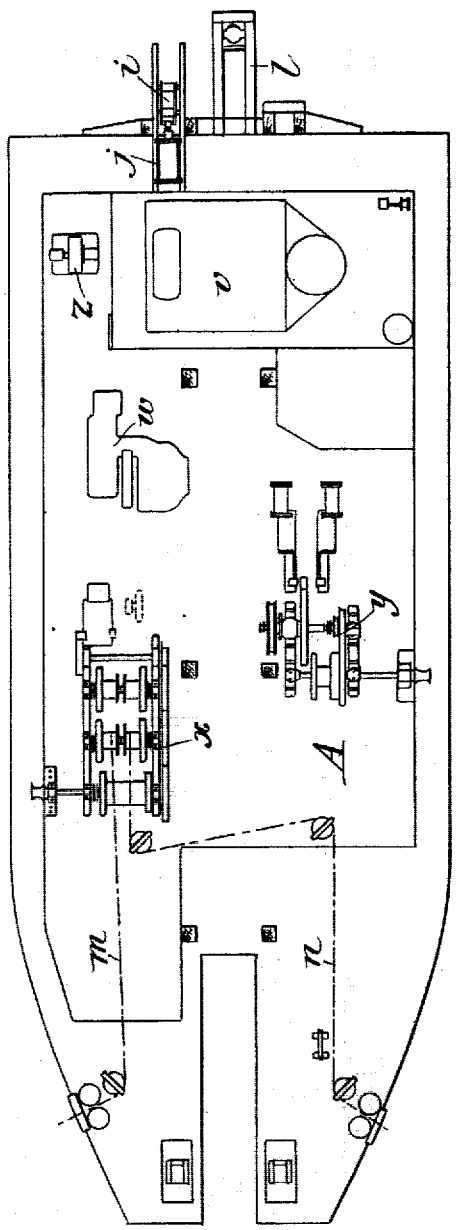

No. 825,545. PATENTED JULY 10, 1906.
S. L. G. KNOX & W. FERRIS.
DREDGING AND CONVEYING APPARATUS.
APPLICATION FILED AUG. 31, 1905.
5 SHEETS—SHEET 1.
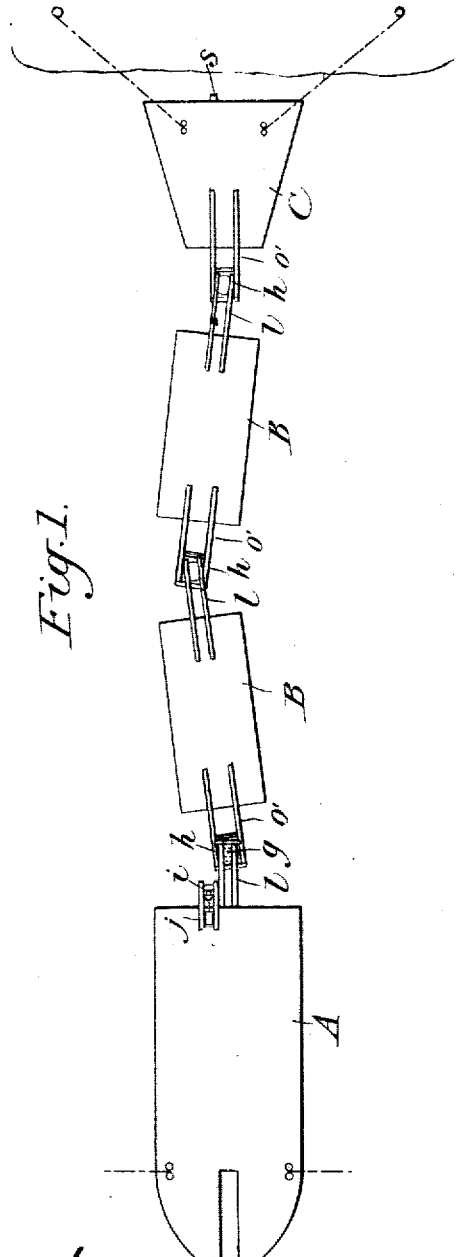
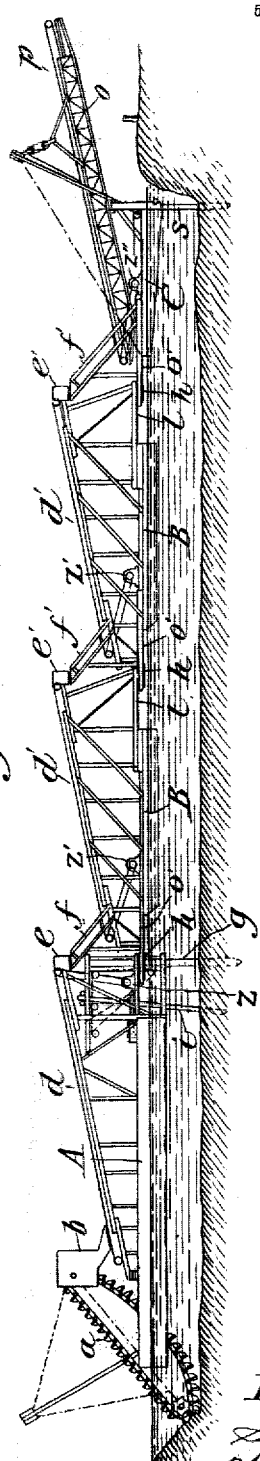
Witnesses:
Inventors, No. 825,545. PATENTED JULY 10, 1906.
S. L. G. KNOX & W. FERRIS.
DREDGING AND CONVEYING APPARATUS.
APPLICATION FILED AUG. 31, 1905.
6 SHEETS—SHEET 2.
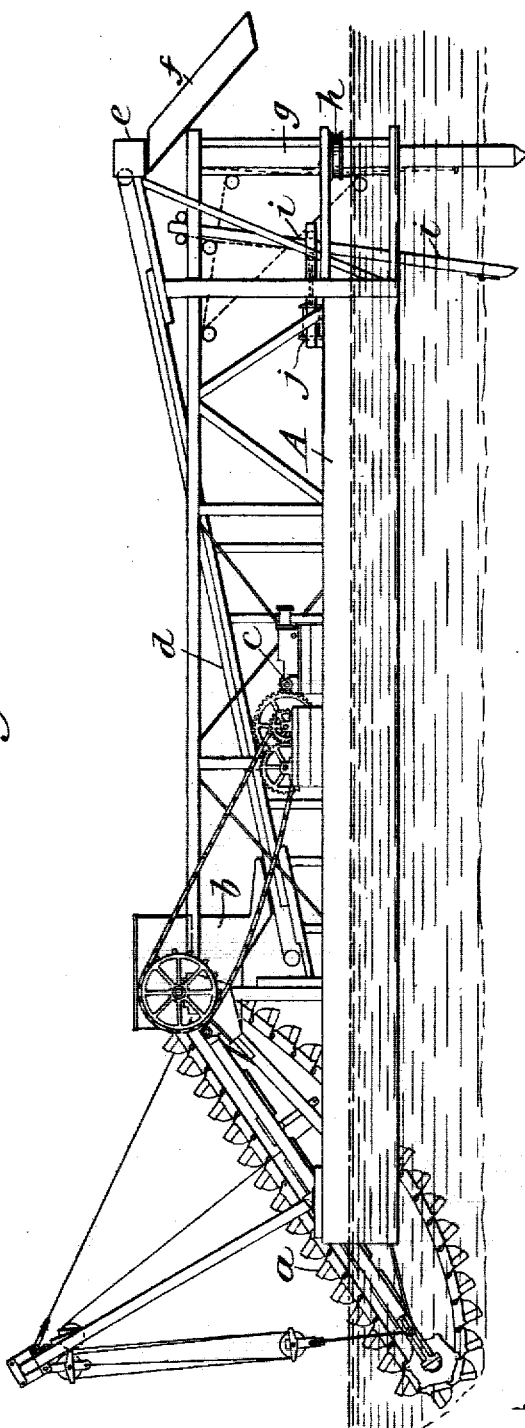

No. 825,545. PATENTED JULY 10, 1906.
S. L. G. KNOX & W. FERRIS.
DREDGING AND CONVEYING APPARATUS.
APPLICATION FILED AUG. 31, 1905.

5 SHEETS—SHEET 3.

Witnesses: Inventors

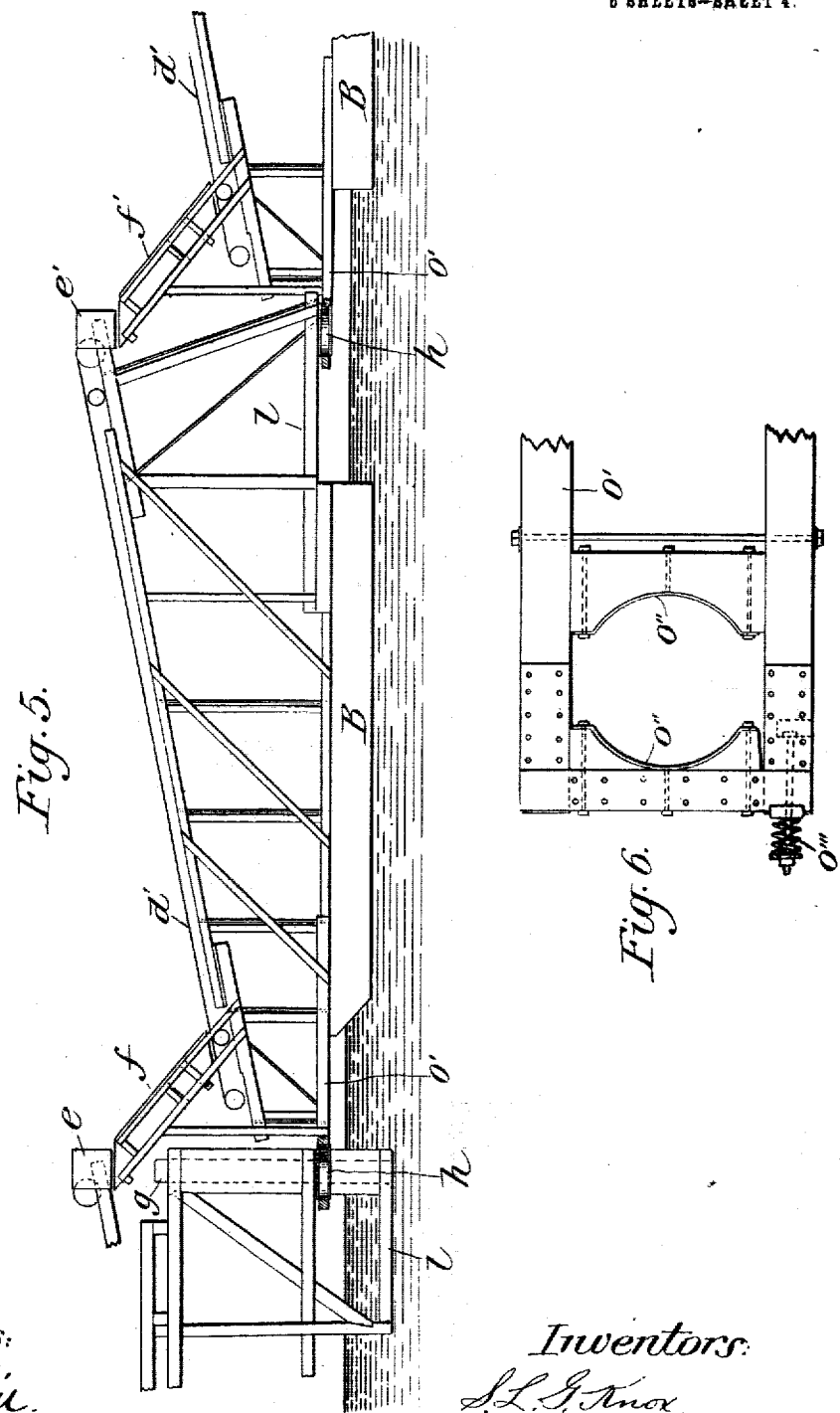

No. 825,545. PATENTED JULY 10, 1906.
S. L. G. KNOX & W. FERRIS.
DREDGING AND CONVEYING APPARATUS.
APPLICATION FILED AUG. 31, 1905.

5 SHEETS—SHEET 5.

Witnesses:
Inventors,

UNITED STATES PATENT OFFICE.

SAMUEL LIPPINCOTT GRISWOLD KNOX, OF MILWAUKEE, AND WALTER FERRIS, OF SOUTH MILWAUKEE, WISCONSIN.

DREDGING AND CONVEYING APPARATUS.

No. 825,545.  Specification of Letters Patent.  Patented July 10, 1906.

Application filed August 31, 1905. Serial No. 276,527.

*To all whom it may concern:*

Be it known that we, SAMUEL LIPPINCOTT GRISWOLD KNOX, residing at Milwaukee, and WALTER FERRIS, residing at South Milwaukee, county of Milwaukee, State of Wisconsin, citizens of the United States, have invented certain new and useful Improvements in Dredging and Conveying Apparatus; and we do hereby declare the following to be a full, clear, and exact description of the invention, such as will enable others skilled in the art to which it appertains to make and use the same.

The invention relates to apparatus for excavating or dredging material from river-beds, &c., and delivering the spoil ashore or to a scow or to any other suitable dump which may be selected by means of a series of conveyer-scows so connected with the dredge as to swing freely under the influence of wind and tide and yet always maintain the proper relation with each other and with the dredge and terminal or delivery scow to receive and transmit the spoil uninterruptedly from the place of excavation to the final dump.

To this end the apparatus comprises an excavating-dredge, a delivery-scow having a conveyer thereon that is adapted to deposit the spoil at the desired place, and an intermediate scow or scows each provided with a conveyer which receives the excavated material from the apparatus next preceding it and delivers it to the conveyer of the succeeding scow, the various hulls being pivotally connected by means of detachable and interchangeable couplings, so that any one of the scows may be connected to the dredge or to any other scow to constitute a flexible chain, of which the dredge forms one end and the delivery-scow the other end. When the material is to be transported a relatively great distance, intermediate scows of the desired number are connected in series between the dredge and the delivery-scow; but where the distance between the dredge and the shore is not great the delivery-scow may be connected directly with the dredge from which it receives the spoil and thence deliver the same to the dump.

In order to insure proper transfer of the spoil from one conveyer to the next in regular succession, special provision is made for maintaining the delivery end of each conveyer in communication with the receiving end of the next in the series, so that as the scows or hulls upon which the conveyers are mounted swing in the tideway or under the influence of the wind the several conveyers will practically operate as a single conveyer between the dredge and the delivery-scow. To accomplish this purpose, the delivery end of each conveyer is located in substantial vertical alinement with the pivotal connection between the hull upon which said conveyer is mounted and the hull next succeeding, so that whatever the angular position of the connected hulls may be the spoil will be delivered from one conveyer to the next without interruption throughout the series.

These and other features of the invention will appear more particularly hereinafter.

Figure 7:
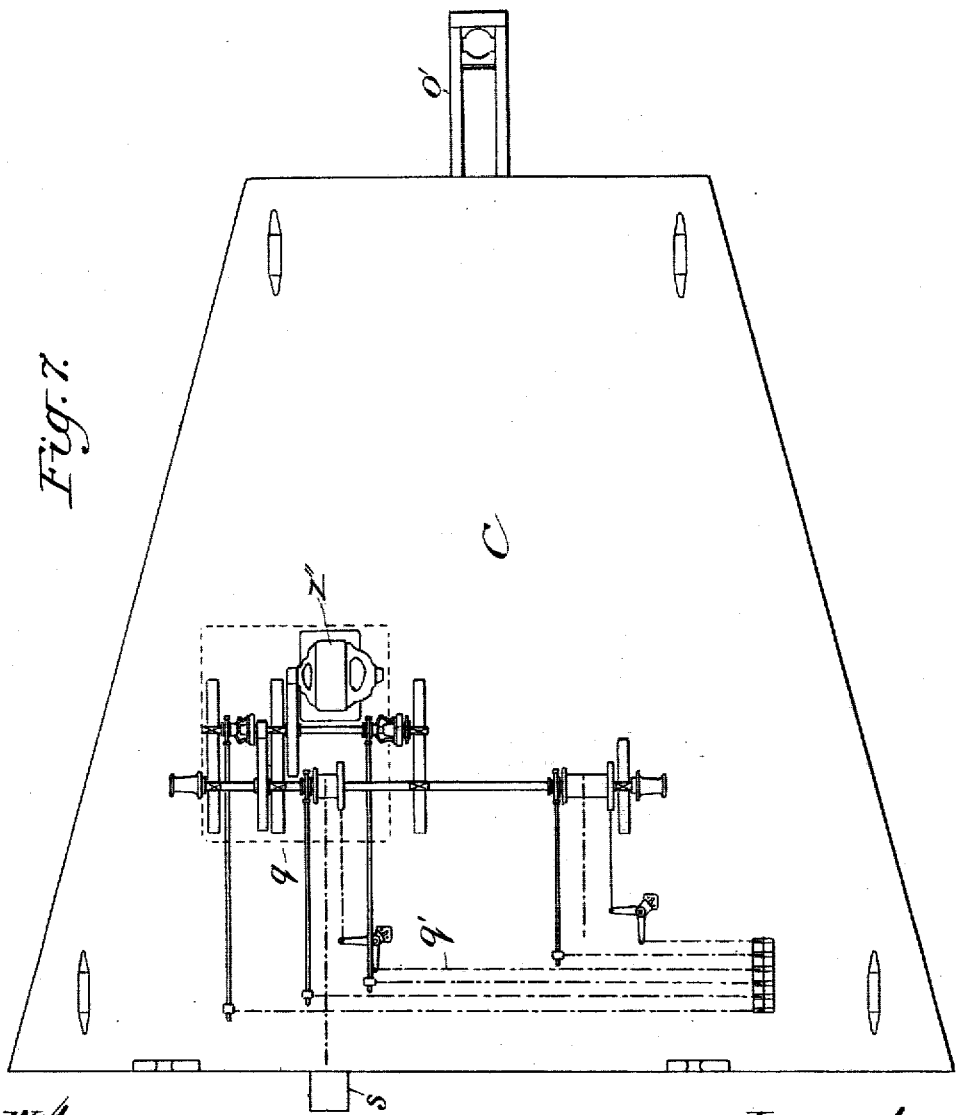

In the accompanying drawings, Figure 1 is a plan view of a dredge or excavator, a delivery-scow, and two intermediate conveyer-scows arranged in accordance with our invention, the operating mechanism on the various hulls being omitted for the sake of clearness. Fig. 2 is a side elevation of the apparatus. Fig. 3 is an enlarged side elevation of a dredge of the elevator type which is particularly well adapted to our invention. Fig. 4 is a plan view of the dredge, showing in diagram the disposition of the operating mechanism thereon, the excavating apparatus and the conveyer being omitted for the sake of clearness. Fig. 5 is a side elevation of a complete intermediate conveyer-scow, illustrating the mode of connecting the same with the dredge and with the next succeeding scow, the pivotal couplings between the hulls being shown partly in section. Fig. 6 is a plan view of the yoke member of the pivotal coupling between the hulls. Fig. 7 is a plan view of the delivery-scow with its operating mechanism exclusive of the elevator, which is omitted to avoid confusion.

Referring to the drawings, A indicates the dredge or excavator which serves to dig the material from the river-bed or like location and deliver the same to the first of a series of intermediate scows B, the last of which discharges the spoil to the delivery-scow C, from which it is deposited upon the dump, in hauling-scows, or at any other desired place.

In the preferred form of the apparatus the dredge or excavator is of the elevator type, having the usual bucket-chain $a$, which digs the material from the river-bed and delivers it to a conveyer $d$, mounted upon the dredge-hull, said conveyer preferably running longitudinally of the hull and having its discharge end located at a point just above the digging-spud $g$, about which the dredge swings in its digging operation. This digging-spud is of the usual type and is preferably located at the center line of the dredge near the stern. This location of the discharge end of the conveyer above the digging-spud is essential in the case of an elevator-dredge, which, as will be understood, operates by revolving or swinging about its digging-spud in order that the dredge may be free to move to and fro and deliver the material continuously to the attached conveyer-scow. The buckets of the excavator-chain discharge the spoil directly into the usual hopper $b$, from which it is delivered upon the upper reach of the endless conveyer $d$, which is mounted upon an upwardly-inclined trestle or framework on the dredge, as clearly illustrated in Figs. 2 and 3. The delivery end of the conveyer $d$ discharges into the upper end of an inclined chute or hopper $f$, mounted upon the first intermediate scow and discharging upon the conveyer of that scow. The upper end of each conveyer is provided with a splash-guard $e$ concentric with the pivot connections between hulls, which insures proper delivery of all material into the upper end of chute $f$. In a system wherein an elevator-dredge is employed it is necessary that the digging-spud $g$ be substantially in vertical alinement with the upper or receiving end of the chute $f$ for reasons hereinbefore referred to; but in the case of a dipper-dredge, which may be employed under certain conditions and which does not revolve about a spud while digging, the chain of intermediate scows may be attached to the dredge at any convenient point by a suitable pivotal coupling, and the material may be discharged directly from the dredge upon the conveyer of the first intermediate scow, as will be understood.

Each intermediate conveyer-scow comprises a hull having thereon an inclined framework or trestle which supports an endless conveyer $d'$ of any preferred type, the lower end of which is adapted to receive the spoil from the inclined chute $f$, mounted upon its own hull, and the upper end of which conveyer discharges into a downwardly-inclined chute $f'$, mounted upon the next succeeding conveyer-hull, to deliver the spoil to the next succeeding conveyer. Projecting from the respective ends of the hull of each intermediate scow are horizontal frameworks $l$ $o'$, each of which forms one member of a pivotal coupling by means of which the scow is flexibly connected to the adjacent members of the system. The framework $l$ has on its under side, near the end thereof, a circular drum $h$, and the framework $o'$ carries at its end a yoke-like device $o''$, which surrounds the drum $h$ and is held in yielding contact with the periphery thereof by means of a spring-bolt $o'''$, which holds the removable block of the yoke $o''$ in position, so that the hulls connected by the coupling may assume any angular position with respect to each other and the chain of connected hulls may move laterally within relatively wide limits between the end members of the system.

The delivery-scow C is provided with a conveyer $p$, preferably of the boom type, adapted to be raised and lowered, and the hull of this scow is provided with additional flotation on the shore or dump side to support a very long overhang of the conveyer, as when the system is employed to deliver the spoil on shore a prime object is to discharge the material as far inshore as possible and at any desired distance from the dredge. The delivery-scow is also provided with a spud $s$, by which it is moored, and winch machinery (designated generally by letters $q$ and $q'$ in Fig. 7) to operate two shore-lines, which enables the operator to swing the conveyer to and fro laterally and to raise and lower the conveyer to vary the points of delivery of the spoil.

In the particular form of the invention illustrated in the drawings the power plant for operating the entire series of conveyers is installed upon the dredge and includes an electric generator $w$, an electric motor $z$ on the dredge for operating the conveyer $d$ thereon, separate electric motors $z'$ on each of the intermediate scows B for operating the respective conveyers $d'$, and an electric motor $z''$ on the delivery-scow, which drives the endless conveyer $p$ and also furnishes the motive power for raising and lowering the conveyer-boom and operating the shore-lines to swing the boom from side to side. Each of the motors is appropriately connected to the generator on the dredge by means of suitable leads connected by flexible couplings from scow to scow, which permit the swinging of the individual scows without injury to the electrical leads.

The intermediate scows are preferably provided with light spuds, by means of which the said scows may be moored separately when not in use, and these spuds, together with the digging-spud $g$ and walking-spud $i$ on the dredge and also the mooring-spud $s$ on the delivery-scow, may be operated by any appropriate mechanism.

The apparatus as above described is adapted to be used in dredging or excavating material from the bottom of a waterway and delivering the same at any desired point— such, for example, as the bank of the waterway or into suitable hauling-scows—and it is to be particularly noted that when a number of intermediate conveyer-scows are employed a highly-flexible chain is produced, whereby the intermediate scows may take their own positions without interrupting the conveying of the spoil continuously from the dredge to the dump. Under certain conditions it may be found expedient to connect the delivery-scow directly to the dredge without the interposition of intermediate conveyer-scows, or in other cases the distance which the spoil has to be conveyed is so short that a single intermediate scow between the dredge and the delivery-scow will suffice. In either of these cases the delivery-scow C must remain stationary while the dredge swings about the digging-spud g. It will be observed that this is readily accomplished by locating the pivotal coupling between the dredge and the intermediate scows or between the dredge and the delivery-scow, as the case may be, so that it is concentric or in substantial vertical alinement with the said digging-spud. By this means the dredge may swing freely about the digging-spud as a center without communicating its motion to the scow coupled thereto. As the delivery end of the conveyer d of the dredge is located directly above the digging-spud and the pivotal coupling, it will also be seen that the spoil is properly discharged from the dredge-conveyer to the conveyer next in the series without interruption. When the distance between the dredge and the dump is considerable, the proper number of intermediate conveyer-scows are connected by the pivotal couplings, hereinbefore described, between the dredge and the delivery-scow, as illustrated in Figs. 1 and 2, wherein it will be seen that the intermediate scows may have a comparatively wide range of lateral motion without interfering with the proper transfer of the material from conveyer to conveyer throughout the series and the dredge may freely swing about its digging-spud without in any way affecting the operation of the other members of the conveyer series.

Having thus described our invention, what we claim, and desire to secure by Letters Patent, is—

1. The combination of a dredge, a traveling conveyer mounted upon a separate hull adapted to receive the spoil from the dredge, and means for flexibly connecting the dredge and conveyer-hulls to permit relative movement of said hulls without affecting the delivery of the spoil from the dredge to the conveyer.

2. The combination of a dredge, a conveyer mounted thereon to receive the spoil from the excavating apparatus, a traveling conveyer mounted on a separate hull to receive the spoil from the first conveyer, and means for flexibly connecting the dredge and conveyer-hulls to permit relative movement of said hulls without affecting the delivery of the spoil from the dredge to the conveyer.

3. The combination of a dredge, two or more scows flexibly coupled in series with the dredge, a traveling conveyer on each scow, and means for delivering the spoil from the excavating apparatus of the dredge to the series of conveyers and thence to the dump.

4. The combination of a dredge, a conveyer mounted thereon to receive the spoil from the excavating apparatus of the dredge, two or more scows flexibly connected in series with the dredge, a traveling conveyer on each scow, and means on each scow for directing the spoil from the conveyer thereon to the conveyer of the succeeding scow.

5. The combination of a dredge, a series of scows flexibly connected in series therewith, conveyers on the dredge and the several scows, and hoppers located in alinement with the discharge ends of the several conveyers to direct the spoil to the several conveyers successively and irrespective of the relative positions of the several hulls.

6. The combination of a dredge having a spud about which it swings while digging, a delivery-scow anchored or moored at the point of deposit, and one or more intermediate traveling conveyer-scows pivotally and detachably connected and adapted to transport the spoil continuously from the dredge to the delivery-scow, irrespective of the position of the several hulls.

7. The combination in a dredge, of a spud about which it swings while digging, and a traveling conveyer which receives the spoil from the excavating apparatus, and delivers it approximately above the center of the spud.

8. The combination of a scow having a traveling conveyer thereon, a second scow pivotally connected to the first scow, and means located above the pivotal connection between the scows for directing the spoil from the delivery end of the conveyer to the second scow.

9. The combination of a scow having a traveling conveyer thereon, a second scow pivotally connected to the first scow, and a hopper above the pivotal connection for directing the spoil from the discharge end of the conveyer to the second scow.

10. The combination of a dredge having a conveyer thereon, a scow having a traveling conveyer thereon, a pivotal connection between the dredge and the scow, and means for delivering the spoil from the discharge end of the dredge-conveyer to the receiving end of the scow-conveyer irrespective of the relative positions of the dredge and scow.

11. The combination of a dredge having a conveyer thereon, a spud about which the dredge swings while digging, a scow having a conveyer thereon, a pivotal connection between the dredge and scow located concentrically with the spud, and a hopper at the discharge end of the dredge-conveyer or the receiving end of the scow-conveyer located above the pivotal connection to deliver the spoil from the dredge-conveyer to the scow-conveyer, for all positions of the dredge and scow.

12. A conveyer-scow, comprising a hull, pivotal couplings at each end thereof to connect the same with other hulls, and a traveling conveyer on said hull having its respective ends substantially in alinement with the corresponding pivotal connections.

13. A delivery-scow, comprising a hull, a pivotal coupling at one end thereof, and a conveyer adapted to receive spoil or other material at a point substantially above said coupling and deliver the material over the side of the hull into a scow or upon the dumping-ground.

14. The combination of a dredge, a series of scows pivotally connected in series with the dredge, a conveyer upon each scow, a source of power on the dredge, and a motor on each scow connected with the source of power to drive the several conveyers.

15. The combination of a dredge, a series of conveyer-scows pivotally connected in series with the dredge, a conveyer upon each scow, an electric generator on the dredge, an electric motor on each scow to drive the several conveyers, and conductors from the generator to the several motors.

16. The combination of an elevator-dredge, an inclined conveyer thereon receiving the spoil from the excavating apparatus, a delivery-scow moored at the place of delivery, a traveling conveyer thereon, one or more intermediate traveling conveyer-scows between the dredge and delivery-scows, and pivotal couplings between each hull and the next succeeding hull substantially in alinement with the delivery and receiving ends of the respective conveyers whereby spoil will be carried from the dredge to the dump irrespective of the relative positions of the several hulls.

In testimony whereof we affix our signatures in presence of two witnesses.

SAMUEL LIPPINCOTT GRISWOLD KNOX.
WALTER FERRIS.

Witnesses:
RIDGELY FLETCHER,
HARRY B. HAYDEN.